April 1, 1958 L. B. McCABE 2,828,578
COMBINATION CASTER AND LEVELLER FOR APPLIANCES
Filed Sept. 14, 1955 2 Sheets-Sheet 1
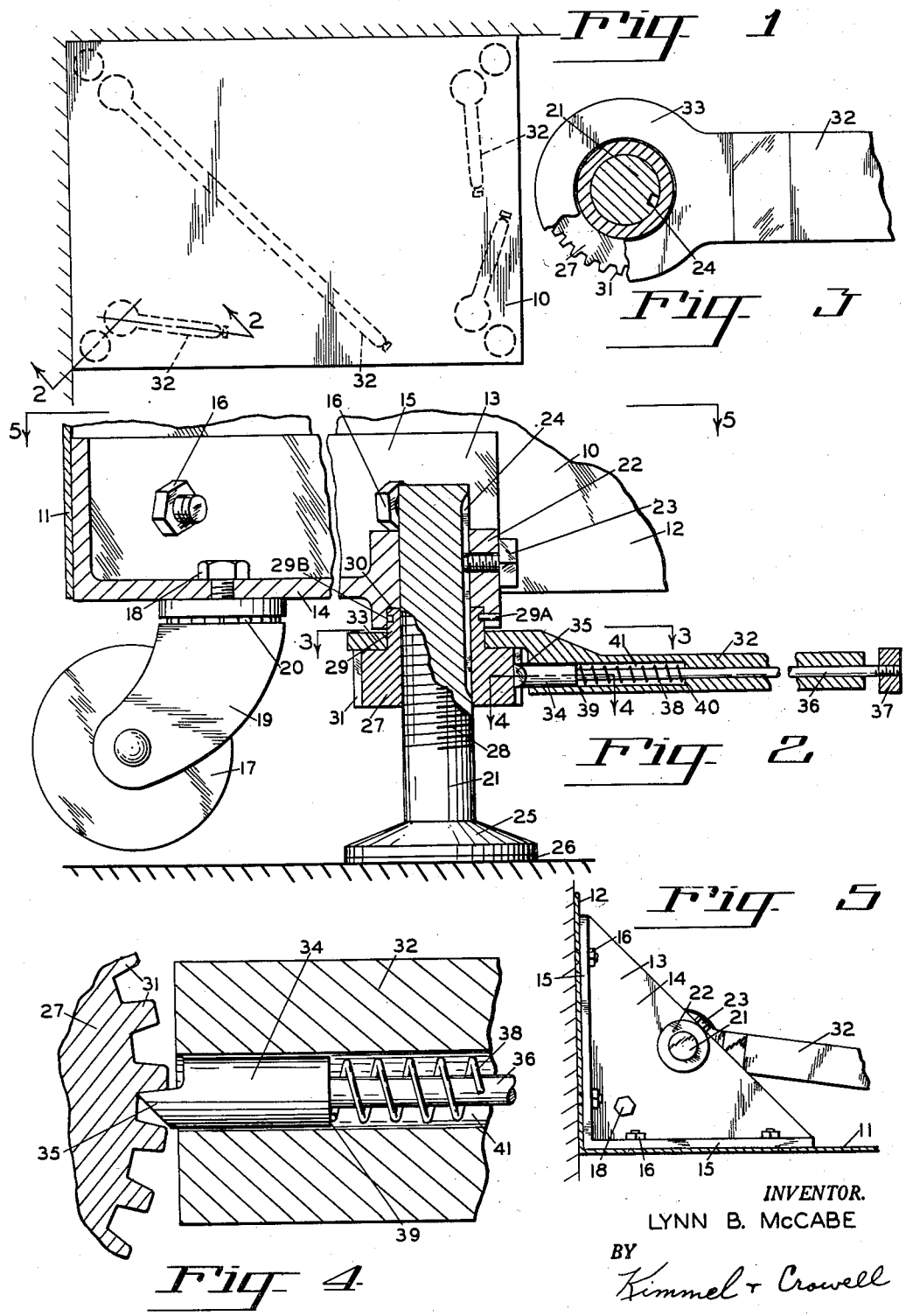
INVENTOR.
LYNN B. McCABE
BY
Kimmel + Crowell
ATTORNEYS April 1, 1958 L. B. McCABE 2,828,578
COMBINATION CASTER AND LEVELLER FOR APPLIANCES
Filed Sept. 14, 1955 2 Sheets-Sheet 2
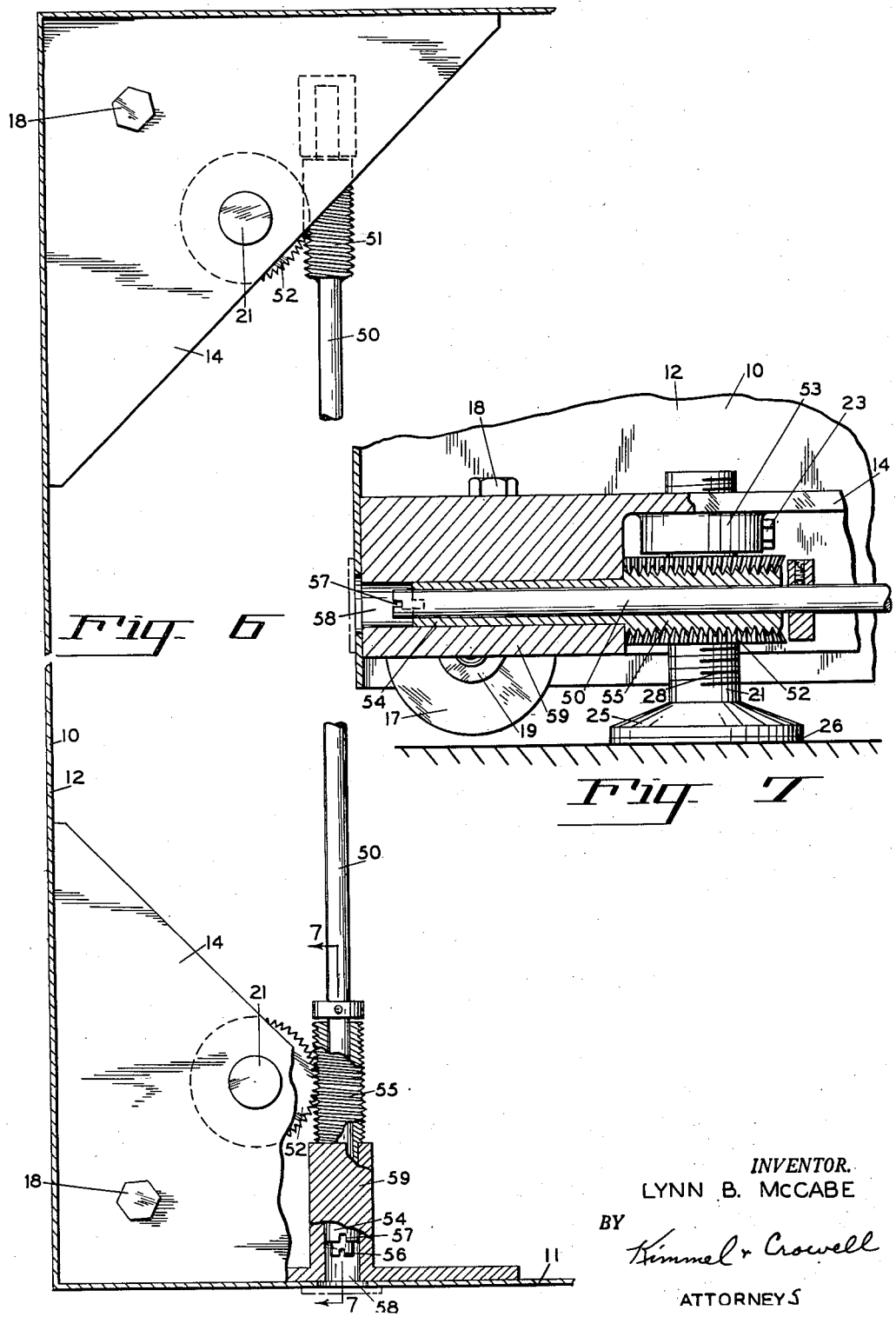
INVENTOR.
LYNN B. McCABE
BY
Kimmel & Crowell
ATTORNEYS

2,828,578

COMBINATION CASTER AND LEVELLER FOR APPLIANCES

Lynn B. McCabe, Junction City, Oreg., assignor of one-half to William M. Miller, Junction City, Oreg.

Application September 14, 1955, Serial No. 534,368

3 Claims. (Cl. 45—139)

This invention relates to a combination caster and level support for appliances, and is particularly adapted to be used in connection with refrigerators, washing and drying machines, and the like.

The primary object of the invention is the provision of casters for supporting appliances, the caster assembly having a levelling feature incorporated therein for levelling the appliance once the appliance has been located.

Another object of the invention is to provide means for raising the appliance off of solid legs onto casters for moving and lowering the legs for supporting the appliance when the same has been located, and means for adjusting the adjusting legs to level the appliance.

Another object of the invention is to provide manual operating means in connection with the casters and levelling device that will always remain with the device so that the appliances can be moved readily upon the caster and reset without bringing in any outside tools for accomplishing this result.

These and other incidental objects will be apparent in the drawings, specification and claims.

Referring to the drawings:

Figure 1 is a plan view of an appliance illustrating this new and improved caster and support installed on all four corners of the appliance, shown by dotted lines;

Figure 2 is a fragmentary part of a lower corner of the appliance, including a sectional view of the caster and supporting element, taken on line 2—2 of Figure 1;

Figure 3 is a plan detail view, taken on line 3—3 of Figure 2, parts broken away for convenience of illustration;

Figure 4 is a fragmentary plan sectional view, taken on line 4—4 of Figure 2, and Figure 5 is a plan view of the caster and supporting device, taken on line 5—5 of Figure 2.

Figure 6 is a fragmentary plan view of another preferred method of raising and lowering the supporting feet of this new and improved caster and levelling device.

Figure 7 is a fragmentary sectional view, taken on line 7—7 of Figure 6.

The appliance to be supported is indicated in general by numeral 10, having the usual lower portion consisting of the side walls 11 and 12. This new and improved caster and supporting device consists of a body member 13, having a horizontal base 14 and upwardly extending flanges 15. The flanges 15 are adapted to be bolted to the lower portion of the side walls 11 and 12 of the appliance 10 by way of the bolts 16, although I do not wish to be limited to any particular method of fastening the caster device to the appliance, as other means of applying the same could be used.

A caster wheel 17 of the usual construction is attached to the base 14 by the usual means, as by bolt 18 which secures the caster wheel forks 19 to the base 14 through the usual bearing 20. The adjustable supporting legs 21 are slidably journalled within the vertical boss or bearing 22 forming part of the base 14 of the body member 13. The leg 21 is slidably mounted within the bearing or boss 22 and prevented from turning by way of the set screw 23 operating within the slot 24 formed in the leg 21.

A foot 25 is formed on the lower end of the legs 21 and may have a rubber pad 26 forming part thereof. A revolvable nut 27 is threaded to the leg 21 by way of the threads 28. This nut has an upwardly extending neck 29 which bears against the shoulder 30 forming part of the boss 22. The neck 29 extends up into the boss 22 and is retained therein by the pin 29A operating within the annular groove 29B, thereby retaining the said nut 27 within the boss 22, preventing the same from dropping down therefrom.

Located on the periphery of the nut 27 are teeth 31, and journalled to the neck 29 of the nut 21 is a handle 32. This handle 32 has an enlarged collar 33 forming part thereof and adapted to encircle the neck 29 of the nut 27, as is best illustrated in Figures 2 and 3. A plunger 34 is slidably mounted within the handle 32 and has a pawl 35 forming part thereof adapted to engage the teeth 31 of the nut 27. The plunger has a control rod 36 extending through the handle 32 and terminating in an operating knob 37.

A spring 38 is adapted to engage the end 39 of the plunger 34 and the shoulder 40 of the enlarged opening 41 within the handle 32. This maintains the pawl 35 within the teeth 31 of the nut 27.

The operation of this device will now be described. Assuming that the appliance stands in the elevated position, as is illustrated in Figure 3, and that the caster wheel 17 is raised above the supporting surface, and further that the pawl 35 is in the position illustrated in Figure 4, the operator pulls the knob 37 of the control rod 36 causing disengagement of the pawl 35 from the teeth 31 of the nut 27. Thereafter, the knob 37 is rotated 180° and is released for return under the tension of spring 38 into engagement with the teeth 31. The handle 32 is then rotated in a counterclockwise direction to effect the descent of the appliance 10 as well as the caster wheel 17. The rotation of the handle 32 in the aforementioned direction is continued until the caster wheel 17 engages the supporting surface. In the event that the supporting surface is uneven, the handle 32 is further rotated in order to elevate the leg 21, the foot 25, and its associated rubber pad 26 a sufficient distance above the supporting surface to clear all obstacles.

The above operations are made with respect to the remaining support members until the appliance rests solely upon the caster wheels 17. Thereafter the appliance may be moved to a new location and levelled by performing the above operations in reverse.

To elevate the appliance 10, the operator again clasps the knob 37 and pulls outwardly thereon to effect the movement of the plunger 34 away from the nut 27 against the tension of the spring 38. This disengages the pawl 35 from the teeth 31 of the nut 27, and thereafter the knob 37 is rotated 180° and released for re-engagement with the teeth 31 in the position shown in Figure 4. The handle member 32 is then rotated in a clockwise direction to effect axial movement of the nut 27 upwardly on the leg 21. The rotation of the nut 27 is continued until the caster wheels 17 have been elevated above the supporting surface and the appliance is level.

Referring to Figures 6 and 7, another preferred method of raising and lowering the supporting legs 21 is by connecting two of the legs together by the cross shaft 50, extending between two of the legs, preferably between a rear leg of an appliance and a front leg.

On one end of the shaft 50 is a worm 51, which is adapted to revolve the worm wheel 52 which is threadedly mounted to the leg 21, similar to the nut 27, referring to Figure 2. The leg is prevented from rotating by the same means as that shown in Figure 2, and the weight of the appliances rests on the top of the worm wheel 52 by way of the bosses 53. The opposite end of the shaft 50 is journalled within the stub shaft 54. The stub shaft 54 has a worm 55 formed thereon which is adapted to rotate the worm wheel.

The shaft 50 has a slot 56 formed on its end adapted to receive a special operating tool, not here shown. The stub shaft 54 is revolved by the cross slots 57 by the opposite end of the special tool being used for rotating the stub shaft 54 and the shaft 50 so that independent operation can be applied to the legs 21.

In order to raise the stub shaft 54 and the shaft 50 by the special tool, an opening 58 is formed in the front of the appliance and may have a special covering indicated by broken lines, placed over the same while not being used. The stub shaft 54 is journalled within the bearing 59 and has a cross slot 57 formed in one end.

Having described and illustrated one embodiment of this invention in detail, it will be understood that the same is offered merely by way of example, and that the invention is to be limited only by the scope of the appended claims.

What is claimed is:

1. A levelling device for appliances comprising a plurality of substantially hollow upright bosses fixedly secured to said appliance adjacent the lower end thereof, an elongated substantially cylindrical, externally threaded leg for each of said bosses, said legs having one of their respective ends disposed within their respective associated bosses, means fixedly securing said legs against rotation in said bosses, a nut threaded on each of said legs and having a plurality of teeth, said nuts each having a side thereof engaging the adjacent side of said bosses, respectively, and ratchet means engaging said teeth to effect relative reciprocal movement between said nuts and said legs whereby said appliance may be elevated or lowered, the ratchet means for each nut being independent to permit selective elevation of said legs.

2. A levelling device for appliances comprising a plurality of body members having horizontal bases, means fixedly securing said bases to the lower ends of said appliance, each of said horizontal bases having an enlarged vertically extending, substantially hollow boss integrally formed therewith, a supporting leg for each of said bosses, said supporting legs being slidably mounted within their respective bosses, means mounted on said bosses and engaging said legs for preventing rotation of said legs about their respective longitudinal axes, each of said legs having an externally threaded portion intermediate the ends thereof, a nut threadedly mounted on said legs, each of said nuts having a plurality of circumferentially spaced teeth formed thereon, each of said legs having an integrally formed enlarged foot at their respective lower ends adapted for engagement against a supporting surface, and ratchet means for effecting independent rotation of each of said nuts on said legs, whereby said legs may be selectively elevated.

3. A levelling device for appliances comprising a plurality of body members, each of said body members including a horizontal base and a plurality of upwardly extending flanges, means fixedly securing said flanges to the lower end of an appliance, each of said bases including a vertically extending enlarged, substantially hollow boss, a substantially cylindrical externally threaded supporting leg slidably mounted within each of said bosses, respectively, each of said supporting legs terminating in an enlarged integrally formed foot at their respective lower ends, an anti-skid pad fixedly secured to each of said feet and adapted for engagement against a supporting surface, each of said legs having a longitudinally extending groove formed therein, each of said bosses having a bolt extending therethrough for sliding engagement within said groove, said bolt and groove cooperating to prevent rotation of said supporting legs about their respective longitudinal axes, a nut threaded on each of said supporting legs, said nut having a plurality of vertically extending circumferentially spaced teeth formed integrally therewith, means connecting each of said nuts with their respective adjacent bosses to prevent longitudinal vertical movement therebetween, and ratchet means supported on said nut and engaging said teeth to effect independent axial movement of said nut relative to said respective supporting leg, whereby independent elevation of said legs may be effected.

References Cited in the file of this patent

UNITED STATES PATENTS

| | | |
|---|---|---|
| 467,096 | Harper | Jan. 12, 1892 |
| 560,933 | Rieff et al. | May 26, 1896 |
| 849,999 | Hendricks | Apr. 9, 1907 |
| 952,644 | Ward | Mar. 22, 1910 |
| 1,051,247 | McLendon | Jan. 21, 1913 |
| 1,417,639 | Sterner | May 30, 1922 |
| 1,417,640 | Sterner | May 30, 1922 |